US006228803B1

(12) United States Patent
Gadkaree et al.

(10) Patent No.: US 6,228,803 B1
(45) Date of Patent: May 8, 2001

(54) METHOD OF MAKING MESOPOROUS CARBON

(75) Inventors: Kishor P. Gadkaree; David L. Hickman; Y. Lisa Peng; Tinghong Tao, all of Big Flats, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/517,795

(22) Filed: Mar. 2, 2000

Related U.S. Application Data

(62) Division of application No. 09/179,080, filed on Oct. 26, 1998.
(60) Provisional application No. 60/074,241, filed on Feb. 10, 1998, and provisional application No. 60/093,396, filed on Jul. 20, 1998.

(51) Int. Cl.⁷ .................................................. C01B 31/08
(52) U.S. Cl. ........................................... 502/416; 428/402
(58) Field of Search .................... 423/445 R; 502/416, 502/423; 428/402

(56) References Cited

U.S. PATENT DOCUMENTS

| | | | | |
|---|---|---|---|---|
| 4,957,897 | * | 9/1990 | Maroldo et al. | 502/432 |
| 5,324,703 | * | 6/1994 | McCue et al. | 502/424 |

* cited by examiner

Primary Examiner—Stuart L. Hendrickson
(74) Attorney, Agent, or Firm—L. Rita Herzfeld; Anca C. Gheorghiu

(57) ABSTRACT

Mesoporous carbon and method of making involves forming a mixture of a high carbon-yielding carbon precursor that when carbonized yields greater than about 40% carbon on a cured basis, and an additive that can be catalyst metal and/or low carbon-yielding carbon precursor that when carbonized yields no greater than about 40% by weight carbon on a cured basis. When a catalyst metal is used, the amount of catalyst metal after the subsequent carbonization step is no greater than about 1 wt. % based on the carbon. The mixture is cured, and the carbon precursors are carbonized and activated to produce mesoporous activated carbon.

3 Claims, No Drawings

METHOD OF MAKING MESOPOROUS CARBON

This application is a division of 09/179,080, filed Oct. 26, 1998, and claims benefit of provisional application 60/074,241, filed Feb. 10, 1998, and provisional of 60/093, 396, filed Jul. 20, 1998.

This application claims the benefit of U.S. provisional application Nos. 60/074,241, filed Feb. 10, 1998, entitled "Mesoporous Carbon Bodies", by Kishor P. Gadkaree, and 60/093,396, filed Jul. 20, 1998, entitled "Method of Making Carbon Having Pore Size Distribution in the Mesopore Range", by Gadkaree et al.

This invention relates to a method of making carbon of various pore sizes, typically greater than 30 angstroms, from carbon precursors, utilizing low-yielding carbon precursors and/or suitable metal catalyst compounds. This ability to tailor pore size distribution is especially important for purification as well as catalytic applications.

BACKGROUND OF THE INVENTION

Activated carbon has found use in various applications such as air and water purification, hydrocarbon adsorption in automotive evaporative emission control and cold start hydrocarbon adsorption, etc. While microporous structure carbon (pore diameter less than 20 angstroms and BET surface area of 1000–3000 $m^2/g$) are suitable for many applications such as gas phase adsorption e.g. light hydrocarbons and $H_2S$, some applications require larger size of pores in the carbon for optimum adsorption and/or catalytic activity. For example, removal of larger molecular size pollutants such as humine, protein, etc. in liquid phase, in addition to conventional gaseous pollutants, such as hydrocarbons, or certain kinds of pesticides require specific surface properties and poresize distributions. When catalytic or chemical reaction is limited by mass and heat transfer, larger size of pores in the carbon is preferred. Also, mesoporosity in the carbon is sometimes required for adequate catalyst loading and dispersion.

Activated carbon monoliths, whether in the form of a coating on a substrate, or a shaped structure of activated carbon, have found use in various applications especially where durability and low pressure drop is required, such as some chemical reactions using strong acidic or basic solvents or other corrosive media.

Metal catalysts have been used to make activated carbon supported catalysts, as have been disclosed in U.S. Pat. No. 5,488,023. However, up to this time, there has not been a method of making activated carbon that having tailored properties, porosity, for example, for some gas and liquid phase, as well as catalytic applications.

SUMMARY OF THE INVENTION

In accordance with one aspect of the invention, there is provided mesoporous carbon and a method of making mesoporous carbon that involves forming a mixture of a high carbon-yielding carbon precursor that when carbonized yields greater than about 40% carbon on a cured basis, and an additive that can be catalyst metal and/or low carbon-yielding carbon precursor that when carbonized yields no greater than about 40% by weight carbon on a cured basis. When a catalyst metal is used, the amount of catalyst metal after the subsequent carbonization step is no greater than about 1 wt. % based on the carbon. The mixture is cured, and the carbon precursors are carbonized and activated to produce mesoporous activated carbon.

DETAILED DESCRIPTION OF THE INVENTION

This invention relates to making mesoporous activated carbon by combining a high carbon-yielding carbon precursor, low carbon-yielding additive and/or catalyst metal compound followed by curing, carbonizing and finally activating the carbon by heat-treatment in activating agents such as steam and carbon dioxide, etc. When a catalyst metal compound is used, the amount of catalyst metal delivered is no greater than about 1% by weight based on the carbon that is present after the carbonization step.

According to this invention, by mesoporous carbon is meant that at least about 50%, and more typically about 60% to 90% of the total pore volume is in the range of 20 to 500 angstroms and no more than 25 percent pore volume is in the range of large pores (>500 angstroms).

By carbon precursor is meant a synthetic polymeric carbon-containing substance that converts to continuous structure carbon on heating. A carbon precursor is preferred over activated carbon particles because as a result of curing, carbonizing and activating, the carbon atoms are arranged in a continuous uninterrupted structure of random three-dimensional graphitic platelets.

By high-yielding carbon precursor is meant that on curing, the precursor yields greater than about 40% of the cured resin is converted to carbon on carbonization. For purposes of this invention, an especially useful high-yielding carbon precursor is a synthetic polymeric carbon precursor, e.g. a synthetic resin in the form of a solution or low viscosity liquid at ambient temperatures or capable of being liquefied by heating or other means. Synthetic polymeric carbon precursors include any liquid or liquefiable carbonaceous substances. Examples of useful carbon precursors include thermosetting resins and some thermoplastic resins.

Low viscosity carbon precursors (e.g., thermosetting resins) are preferred for coating applications because their low viscosity allows greater penetration into the substrate. Typical resin viscosity ranges from about 50 to 100 cp. Any high carbon yield resin can be used. Phenolic and furan resins are the most suitable. Phenolic resins are most preferred due to their low viscosity, high carbon yield, high degree of cross-linking upon curing relative to other precursors, and low cost. Suitable phenolic resins are resole resin such as 43250 polyophen resin, and 43290 from Occidental Chemical Corporation, and Durite resole resin from Borden Chemical Company. One especially suitable furan liquid resin is Furcab-LP from QO Chemicals Inc.

The carbon precursor can include a single high carbon-yielding precursor material, or a mixture of two or more such precursor materials. Optionally, already-made activated carbon can be added to liquid carbon precursor to adjust the viscosity of the precursor for forming or shaping into structures.

To obtain carbon of desired porosity, a catalyst metal and/or low carbon-yielding carbon precursor is included with the high-carbon-yielding carbon precursor.

The low carbon-yielding carbon precursor is that which when carbonized has a carbon yield of no greater than about 40% on a cured basis. Some especially useful low carbon-yielding carbon precursors are cross linking additives are glycerine, melamine formaldehyde, epoxy, and/or polyvinyl alcohol. One advantage of using the low carbon-yielding carbon precursor alone without the catalyst metal is that the step of removing the catalyst metal in cases where a catalyst metal is not desired in the final product, is eliminated.

When metal catalysts are present in the carbon matrix, topographical effects of surface etching, channeling and etch pitting are induced by each individual metal additive during activation, depending on their own physical and chemical properties, carbon structures, and reaction conditions. To selectively generate desirable mesoporous activated carbon, these three actions are coordinated to provide desired pore size. Channeling and pitting provide a chance to produce pores, and surface etching provides a chance for pore enlargement.

The metal catalyst suitable can be alkali, alkaline earth, transition, and/or noble metal. Advantageously, the catalyst metals are Pt, Pd, Rh, Ag, Au, Fe, Re, Sn, Nb, V, Zn, Pb, Ge, As, Se, Co, Cr, Ni, Mn, Cu, Li, Mg, Ba, Mo, Ru, Os, Ir, Ca, Y or combinations of these. Preferred metals are Pt, Co, Ni, and/or Fe, especially Fe in the +3 oxidation state; with Co being especially preferred. The metal catalyst is preferably in the form of a precursor or compound e.g. organic or inorganic salt of a catalyst metal, which decomposes to the catalyst metal or catalyst metal oxide on heating, such as sulfates, nitrates, etc. A metal compound, preferably finely dispersed, is preferred to the elemental form because metal powder tends to form larger grains of graphitic regions instead of the favored opposite effect. Examples of compounds are oxides, chlorides, (except alkali or alkaline earths) nitrates, carbonates, sulphates, complex ammonium salts, etc. Organometallic compounds of the appropriate type metals can be used with or without low carbon-yielding carbon precursor. For example, acetates such as cobalt acetate, and/or acetylacetonates such as cobalt, platinum, and/or iron acetylacetonate are especially suited. While not wishing to be bound by theory, it is believed that the bulky organic structure introduced to the resin is thermally set after curing to the matrix and may help form more porosity when these structures are removed during carbonization. Therefore, more catalysts are exposed to the surface for additional pore size engineering during activation step.

The amount of metal catalyst used in the invention depends on the type or activity of the metal catalyst, as well as the final porosity and pore size distribution desired, but is no greater than about 1%, and typically from about 0.01% to 1%, and most typically about 0.01% to 0.2% by weight based on the carbon present after carbonization. For highly active Co, the concentration can be as low as 50 to 100 ppm. The amount of metal addition significantly affects the final pore structures generated. Adding too much metal, however, will cause significant increase in the metal sintering rate. The sintered particle tends to block the pores and form the so-called bottle-necked pores. Also, when sintering happens, the activity of the catalysts drops and even deactivates.

In some cases it is desirable to include both a catalyst metal and low carbon-yielding carbon precursor as the additives. For example combinations of cobalt e.g, cobalt acetate or nitrate and/or iron compounds, e.g. iron nitrate, with the above cross-linking additives are useful. Especially advantageous are combinations of cobalt acetate or iron acetylacetonate with glycerine and/or polyvinyl alcohol.

One useful method of making the mesoporous activated carbon is to coat an inorganic substrate such as a honeycomb with a coating suspension or solution of the carbon precursor and the catalyst metal compound, followed by curing, carbonizing, and activating the carbon to form a continuous coating of activated carbon. For example, about 7 g of catalyst precursor, Co(II) nitrate is first dissolved into a small amount of water, and then put into 1000 ml of low viscosity phenolic resole resin. The mixture is homogenized to form a uniform solution. The suspension or solution is then coated onto a substrate, e.g. a monolithic substrate such as one made of cordierite. This is then cured at about 150° C., after drying at about 90–100° C., and then carbonized and activated in activating agents such as carbon dioxide or steam.

The substrate has an outer surface from which pores extend into the substrate. The coating penetrates into and is distributed throughout these pores as a coating thereon.

In its most useful form the monolithic substrate has means for passage of a fluid stream therethrough, e.g., a network of pores communicating from the outside to the inside, and/or through channels extending from one end of the monolith to the other for passage of the fluid stream into one end and out through the other end.

The substrate must have enough strength to function in the application and be capable of withstanding the heat-treating temperature experienced in forming the activated carbon coating.

It is desirable that the overall open porosity of the substrate be at least about 10%, preferably greater than about 25% and most preferably greater than about 40%. For most purposes, the desirable range of porosity is about 45% to about 55%. Preferably the pores of the substrate material create "interconnecting porosity" which is characterized by pores which connect into and/or intersect other pores to create a tortuous network of porosity within the substrate.

Suitable porous substrate materials include ceramic, glass ceramic, glass, metal, clays, and combinations thereof. By combinations is meant physical or chemical combinations, e.g., mixtures, compounds, or composites.

Some materials that are especially suited to the practice of the present invention, although it is to be understood that the invention is not limited to such, are those made of cordierite, mullite, clay, magnesia, and metal oxides, talc, zircon, zirconia, zirconates, zirconia-spinel, magnesium alumino-silicates, spinel, alumina, silica, silicates, borides, alumino-silicates, e.g., porcelains, lithium aluminosilicates, alumina silica, feldspar, titania, fused silica, nitrides, borides, carbides, e.g., silicon carbide, silicon nitride or mixtures of these. Cordierite is preferred because its coefficient of thermal expansion is comparable to that of carbon, increasing the stability of the activated carbon body. Some typical ceramic substrates are disclosed in U.S. Pat. Nos. 4,127,691 and 3,885,977. Those patents are herein incorporated by reference as filed.

Suitable metallic materials are any metal or alloy or intermetallic compound that provides durable structural service, and does not soften below about 600° C. Particularly useful are alloys that are predominantly of iron group metal (i.e. Fe, Ni, and Co), either with carbon (e.g. steels, especially stainless or high temperature steels) or without carbon. Most typical of the latter alloys for higher temperature service are those consisting essentially of iron group metal and aluminum, with the preferred iron group metal being iron. Especially preferred is Fe, Al, and Cr. For example, Fe5-20Al5-40Cr, and Fe7-10Al10-20Cr powders with other possible additions are especially suited. Some typical compositions of metal powders for forming substrates are disclosed in U.S. Pat. Nos. 4,992,233, 4,758,272, and 5,427,601 which are herein incorporated by reference as filed. U.S. Pat. Nos. 4,992,233 and 4,758,272 relate to methods of producing porous sintered bodies made from metal powder compositions of Fe and Al with optional additions of Sn, Cu, and Cr. U.S. Pat. No. 5,427,601 relates to porous sintered bodies having a composition consisting essentially of in percent by weight about 5 to 40 Cr, about 2 to 30 Al, 0 to about 5 of special metal, 0 to about 4 of rare earth oxide additive and the balance being iron group metal and unavoidable impurities, with the preferred iron group metal being iron. When rare earth oxide is present, the special metal is at least one of Y, lanthanides, Zr, Hf, Ti, Si, alkaline earth metal, B, Cu, and Sn. When no rare earth oxide is present, the special metal is at least one of Y, lanthanide, Zr, Hf, Ti, Si, and B, with optional additions of alkaline earths, Cu, and Sn.

The substrate is preferably a honeycomb or matrix of thin walls forming a multiplicity of open-ended cells extending between the ends of the honeycomb.

Generally honeycomb cell densities range from 235 cells/$cm^2$ (about 1500 cells/$in^2$) to 1 cell/$cm^2$ (about 6 cells/$in^2$). Some examples of commonly used honeycombs in addition to these, although it is to be understood that the invention is not limited to such, are about 94 cells/$cm^2$ (about 600 cells/$in^2$), about 62 cells/$cm^2$ (about 400 cells/$in^2$), or about 47 cells/$cm^2$ (about 300 cells/$in^2$), and those having about 31 cells/$cm^2$ (about 200 cells/$in^2$). Typical wall thicknesses are for example, about 0.15 mm for about 62 cells/$cm^2$ (about 400 cells/$in^2$) honeycombs. Wall (web) thicknesses range typically from about 0.1 to about 1.5 mm. The external size and shape of the body is controlled by the application.

Cordierite honeycombs are especially preferred as substrates for the mesoporous activated carbon.

The contacting is done by any method suitable to bring the carbon precursor and metal catalyst in intimate contact with the inorganic substrate. Exemplary methods of contacting include dipping the substrate in the carbon precursors) (with or without catalyst metal) solution or slurry, or spraying the carbon precursors) (with our without catalyst metal) solution or slurry directly on the substrate.

Another useful method of making the activated carbon with catalyst metal is to shape a mixture of the carbon precursor(s), (with or without catalyst metal), binders and/or fillers, and forming aids, such as by extrusion.

Some binders that can be used are plasticizing temporary organic binders such as cellulose ethers. Some typical cellulose ethers are methylcellulose, ethylhydroxy ethylcellulose, hydroxybutylcellulose, hydroxybutyl methylcellulose, hydroxyethylcellulose, hydroxymethylcellulose, hydroxypropylcellulose, hydroxypropyl methylcellulose, hydroxyethyl methylcellulose, sodium carboxy methylcellulose, and mixtures thereof. Methylcellulose and/or methylcellulose derivatives are especially suited as organic binders in the practice of the present invention with methylcellulose, hydroxyprdpyl methylcellulose, or combinations of these being preferred.

Some fillers that are suited include both natural and synthetic, hydrophobic, and hydrophilic, fibrous and non-fibrous, carbonizable and non-carbonizable fillers.

For example some natural fillers are soft woods, e.g. pine, spruce, redwood, etc., hardwoods e.g. ash, beech, birch, maple, oak, etc., sawdust, shell fibers e.g. ground almond shell, coconut shell, apricot pit shell, peanut shell, pecan shell, walnut shell, etc., cotton fibers e.g. cotton flock, cotton fabric, cellulose fibers, cotton seed fiber, chopped vegetable fibers for example, hemp, coconut fiber, jute, sisal, and other materials such as corn cobs, citrus pulp (dried), soybean meal, peat moss, wheat flour, wool fibers, corn, potato, rice, tapioca, coal powder, activated carbon powder, etc. Some synthetic materials are regenerated cellulose, rayon fabric, cellophane, etc.

Some examples of carbonizable fillers that are especially suited for liquid resins are cellulose, cotton, wood, and sisal, or combinations of these, all of which are preferably in the form of fibers.

Some inorganic fillers that can be used are oxygen-containing minerals such as clays, zeolites, talc, etc., carbonates, such as calcium carbonate, aluminosilicates such as kaolin (an aluminosilicate clay), flyash (an aluminosilicate ash obtained after coal firing in power plants), silicates, e.g. wollastonite (calcium metasilicate), titanates, zirconates, zirconia, zirconia spinel, magnesium aluminum silicates, mullite, alumina, alumina trihydrate, spinel, feldspar, attapulgites, and aluminosilicate fibers, cordierite powder, etc.

Some examples of especially suited inorganic fillers are cordierite powder, talcs, clays, and aluminosilicate fibers.

Organic fillers provide additional support to the shaped structure and introduce wall porosity on carbonization because in general they leave very little carbon residue. Some organic fillers are polyacrylonitrile fibers, polyester fibers (flock), nylon fibers, polypropylene fibers (flock) or powder, acrylic fibers or powder, aramid fibers, polyvinyl alcohol, etc.

Some binders and fillers that are especially suited are described in U.S. Pat. No. 5,820,967 filed May 20, 1996. That application is herein incorporated by reference.

Some forming e.g. extrusion aids are soaps, fatty acids such as oleic, linoleic acid, etc., polyoxyethylene stearate, etc. or combinations of these. Especially preferred is sodium stearate. Optimized amounts of extrusion aid(s) depend on the composition and binder.

The carbon precursor and metal catalysts (if present), mixed with correct amounts of the above-mentioned gradients are then subjected to heat-treatments is to convert the carbon precursor to continuous carbon (carbonize).

The resulting carbon is then heat-treated to activate the carbon and produce an activated carbon structure.

When the carbon precursor is a thermosetting resin, the carbon precursor is cured prior to activation and most typically prior to carbonization. The curing is accomplished typically by heating the precursor to temperatures of about 100° C. to about 200° C. for about 0.5 to about 5.0 hours. Curing is generally performed in air at atmospheric pressures. When using certain precursors, (e.g., furfuryl alcohol) curing can be accomplished by adding a curing catalyst such as an acid catalyst at room temperature. The curing also serves to retain the uniformity of the metal compound catalyst distribution in the carbon.

Carbonization is the thermal decomposition of the carbonaceous material and embodied metal compound catalyst (if present), thereby eliminating low molecular weight species (e.g., carbon dioxide, water, gaseous hydrocarbons, etc.) and producing a fixed carbon mass and a rudimentary pore structure in the carbon.

Such conversion or carbonization of the cured carbon precursor is accomplished typically by heating to a temperature in the range of about 400° C. to about 800° C. for about 1 to about 10 hours in a reducing or inert atmosphere (e.g., nitrogen, argon, helium, etc.).

Curing and carbonizing the carbon precursor results in substantially uninterrupted carbon with uniformly dispersed catalyst particles (if present) in carbon body. The catalyst usually is aggregated into larger particles, different from the cured structures, where catalyst is molecularly dispersed. The size of the catalyst particle depends on the amount added to the starting resin. The more catalyst in the initial resin, the easier the catalyst particle aggregates. The size of the catalyst particle also depends on the carbonization and activation temperature. Higher carbonization and activation temperatures induce significant metal sintering even when the metal concentration is relatively low. Where the carbon is in the form of a coating, the carbon coating is anchored into the porosity of the substrate and as a result is highly adherent. The top surface of the carbon coating is an uninterrupted layer of carbon to carbon bonds. If interconnecting porosity is present in the substrate, an interlocking network of carbon will be formed within the composition, resulting in an even more adherent carbon coating. The coating of uninterrupted carbon extending over the outer surface of the substrate formed provides a structure with advantages of high catalytic capability despite a relatively low carbon content, high strength, and high use temperatures. Structures can be formed which contain carbon in an amount less than and up to about 50% often less than and up to about 30% of the total weight of the substrate and carbon.

Curing and carbonizing the catalyst metal compound in the carbon precursor results in uniform and intimate chemical bonding of catalyst with uninterrupted carbon structure. The resulting catalyst particle size, controlled by catalyst loading, process parameters, and nature of catalyst, etc., is a primary factor to determine pore sizes in the activated carbon. Well-dispersed and uniform catalyst particle size can help to develop mesopores in the activated carbon in the latter activation step.

The activation is done in a catalytic way to substantially create new porosity in the mesopore size range, as well as to enlarge the diameter of the micropores formed and therefore to increase the pore volume. Forming micropores without the assist of metal catalyst or the low carbon yielding carbon precursor according to this invention is usually inevitable. In general, activation can be carried out by standard methods, in carbon dioxide or steam at about 400–900° C. If activation is in steam, the temperatures are preferably about 400° C. to about 800° C.

The lower carbonization and activation temperature is preferred when carbonizing and activating catalyst-containing resins. At the carbonization stage, a low temperature not only helps forming less sintered large metal particles, but also contributes to forming a relatively less condensed carbon structure. Both factors are very important for the subsequent pore generation during the activation step. For the same reason, a lower activation temperature is preferred. From this point of view, steam activation is more preferred than carbon dioxide activation, because of the lower temperature requirement of steam due to its higher reaction rates. The presence of a catalyst provides new catalytic active sites to start pore formation in activation process instead of only carbon sites in non-catalytic activation. The catalytic carbon activation reaction is faster than non-catalytic carbon activation. Due to reaction rate difference between catalytic and non-catalytic modes, the catalytic activation becomes overwhelmingly predominant over non-catalytic activation under activation conditions. In addition, the presence of catalyst induces topographical effects on pore formation during catalytic activation. Depending upon reaction conditions and nature of catalysts on the carbon surface, pores greater than about 30 angstroms can be selectively generated.

In accordance with one embodiment, the catalyst metal is Pt, e.g. in the form of dihydrogen chloroplatinic acid and the activation temperature is about 650° C. to 750° C. in steam. Such conditions produce activated carbon having about 60% to 95% of the total porosity in the mesopore range, and about 80 to 90% of the mesopore volume is in the pore size range of about 40 to 300 angstroms.

In accordance with another embodiment, the catalyst metal is Co, e.g. in the form of cobalt nitrate and the activation temperature is about 650° C. to 750° C. in steam. Such conditions produce activated carbon about having 60 to 85% of the total porosity in the mesopore range, and about 60 to 90% of the mesopore volume is in the pore size range of about 100 to 400 angstroms.

In accordance with still another embodiment, the catalyst metal is Fe, particularly in the +3 oxidation state, e.g. in the form of iron nitrate hexahydrate and the activation temperature is about 650° C. to 800° C. in steam. Such conditions produce activated carbon having about 80 to 95% of the total porosity is in the mesopore range, and that about 85 to 95% of mesopore volume is in the pore size range from 30 to 60 angstroms.

Synthetic polymer-based carbon precursors, like phenolic resin typically forms hard carbon (also called char) with short-ranged graphitic microcrystalline structures after carbonization in inert atmosphere. The char that forms is very carbon-rich with a small amount of porosity produced during removal of volatile products. While not wishing to be bound by theory, it is believed that the increase in pore sizes in carbon brought about by adding metal in the form of organo and inorgano-metallic compounds and activating the char using steam or carbon dioxide is due to:

1) The increase in turbostratic nature of the resulting char even before activation. In other words, the finely dispersed metal compounds promote the formation of even more disordered structure during carbonization than would otherwise occur.

2) The metal compounds are reduced to the metallic state after carbonization. They are highly active and promote the activity of the carbon in their vicinity. Larger pores are therefore generated around the catalysts. Catalytic activation with the metal additives significantly increases the rate of activation. Moreover, the activation is carried out preferentially in the immediate vicinity of the metal particles. As catalyst particles are pitting, channeling and surface etching through the carbon body, the size of pores formed (channels and pits) are equivalent or greater than the size of catalyst particles. By adjusting catalyst particle size, the mesopores and even macropores can be selectively produced.

3) Activation in steam is preferred to carbon dioxide. Steam produces a wider porous texture, and a more mesoporous carbon and requires a much lower temperature than $CO_2$.

Catalyst metals, if present, can be removed from the resulting mesoporous activated carbon body, or they can remain if they are needed in catalytic operations, etc. Removal is done by treating the body with an agent in liquid phase that will leach out the metal into solution and the metal will then be washed away. Such agents are acids and bases, such as nitric, which will leach out most metals. Hydrochloric acid instead of nitric acid works effectively for metals, which form coordination compounds with the chloride such as platinum. Acetic acid can be used for species that readily form acetates. If the carbon surface is oxidized, as it may be if nitric acid or another oxidizing agent is used, it can be subjected to a subsequent treatment at elevated temperatures in nitrogen or hydrogen to produce a reduced surface.

The metal removal can also be done by treating the body with heat or an agent in gas phase that will form volatile metal compounds and the formed volatile compounds will release into gas phase by heating. Such agents are carbon monoxide, hydrogen, and chlorine, etc. depending on nature of metal catalysts. Alkali metal can be directly removed from carbon body by heat treatment due to its high volatility. Metals like nickel, iron, cobalt, etc. can be removed through their volatile carbonyl compounds formed with carbon monoxide.

To more fully illustrate the invention, the following non-limiting examples are presented. All parts, portions, and percentages are on a weight basis unless otherwise stated.

CATALYST METAL EXAMPLES

Example 1: (comparative):

Low viscosity phenolic resin about 100 to 150 cp was dip-coated onto ceramic cordierite honeycombs having about 50% open porosity. They were then dried at 95° C., cured at 150° C., carbonized at 750° C. in $N_2$ and activated in $CO_2$ at 900° C. for various time periods. Percent pores in each of the three ranges were determined on a volume basis using $N_2$ adsorption. The percent pore volume in the micropore range was determined using the standard t-method. Percent mesopore volume was determined using the BJH method. The resultant activated carbons feature mainly the characteristics of microporous carbons. Greater than about 80% of pore volume is in the micropore range. Surface areas are at least above 1000 $m^2$/g carbon. Although as the level of burn-off on activation increases, the percent of mesopores increases slightly, the magnitude of increase is small compared to the level of carbon being burned-off. Conventional activated carbon manufacturing tends to produce predominantly microporous carbon, regardless of how high the burn off can be. Surface area did increase significantly with the level of burn-off. The pore size distributions tend not to change much with the increasing of burn-off. In the burn-off range of the example, activation is a steady state carbon removal reaction.

Example 2: Inventive:

Ferric nitrate was used as the catalyst metal. About 7 g of ferric nitrate was added to a small amount of water. After it was completely dissolved, it was mixed into about 1000 ml of phenolic resole resin (same resin as above) and stirred vigorously to ensure homogeneous dispersion of the catalyst precursor. The metal containing mixture was dip-coated using a cordierite honeycomb that had about 50% open porosity, and then dried at about 95° C. and cured at about 150° C., carbonized at about 750° C. for about 1 hr in $N_2$, and activated at about 700° C. for a period of 1 to 4 hours in steam and nitrogen mixture. The resulting sample of activated carbon was analyzed using $N_2$ adsorption isotherm for pore size distribution. The resulting activated carbon is mainly mesoporous, the mesoporous content being 80–90% of the total porosity. The carbon has about 10% of micropores and macropores. The majority of pores in the mesopore range is around 30 to 60 angstroms (85% of mesopores) with a peak at 38 angstroms. The surface area of the mesoporous carbon ranges from 500 to 650 $m^2$/g carbon.

There is a significant drop in the total surface area in the catalyst-assisted activation, indicating the presence of larger pores. The amount of microporosity dropped significantly with the addition of catalysts. The amount of mesoporosity tends to increase with the level of carbon burn-off. The Fe-containing carbon produced a mesoporous carbon with a peak around 38 angstroms in the mesopores range.

Example 3: Inventive:

Cobalt nitrate was used as the catalyst metal. About 7.0 g Co was used, following the same procedure as Example 2. The resulting activated carbon has around 70 to 80% mesopore and 20 to 25% macropore content. The surface areas range from 450 to 550 $m^2$/g carbon. Cobalt-containing carbon produced a bi-modal distribution in the mesopore range, with peaks centered around 38 and 250 angstroms.

Example 4: Inventive:

The procedure of Example 2 was followed, except that the metal compounds added were reduced to about 2.8 grams, also the activations were conducted at 700° C. in steam and nitrogen mixture. The resultant activated carbon has 60% mesopores and 25% macropores, with a surface area of around 600 $m^2$/g. This carbon also has a single peak in the mesopore range at 250 angstroms. The size of the peak is such that about 75% of the mesopore volume was in the pores ranging from 100 to 400 angstroms.

Example 5: Inventive:

Dihydrogen chloroplatinic acid (CPA) was used as catalyst metal. About 5 g of CPA was added following the same procedure of Examples 2 and 3. The resultant activated carbon has about 70% mesopore and 10% macropore content, with a surface area close to 550 $m^2$/g. This carbon has a characteristic peak in the mesopore range centered at 100 angstroms. The size of the peak is such that about 80% of the mesopore volume was in the pores ranging from 40 to 300 angstroms.

Example 6: Comparative:

Phenolic resole resin from Occidental Chemical Co., Niagara Falls, N.Y was coated onto a cordierite honeycomb and then dried at about 90° C., cured at about 125–150° C., and carbonized in nitrogen at about 900° C. and activated in carbon dioxide at about 900° C. The pore size distribution of the resulting carbon was measured on Micrometrics (norcross, Ga.) ASAP 2000 equipment via measurement of nitrogen adsorption isotherm. Carbon is essentially all microporous with all the pores in the 10 angstrom or lower range.

Example 7: Inventive:

Example 6 was repeated except that to the resin, about 1% iron acetyl acetonate was added before coating. The coated honeycomb was cured, carbonized, and activated in carbon dioxide. About 60% of the of mesopores present have a mean pore size of about 90 angstroms.

Example 8: Comparative:

An extruded resin honeycomb was fabricated by mixing about 55.6% phenolic resole from Borden, Inc. with about 14.7% cordierite grog, about 22.2% cellulose fiber, about 2% phosphoric acid, about 4.6% Methocel®, and about 0.9% sodium stearate. The mixture was extruded and then the resulting honeycomb was dried at about 90° C., cured, carbonized, and activated at about 900° C. in carbon dioxide. The pore size distribution shows essentially all microporous carbon with a mean pore size of about 5 angstroms and little or no mesoporosity.

Example 9: Inventive:

The experiment of Example 8 was repeated but with about 1% cobalt acetate added to the resin prior to mixing. The sample was processed as in Example 8. The pore size distribution shows 70% volume at about 400 angstroms.

Example 10: Inventive:

The procedure of Example 6 was repeated, but to the resin was added about 50% glycerine and about 1% cobalt acetate based on the total coating liquid. On coating and processing as in Example 6, the pore size distribution shows about 70% mesopore volume with a mean pore size of about 500 angstroms. Only about 20% of the volume is in the micropore range.

Example 11: Inventive:

In an experiment similar to that of Example 10, about 20% polyvinyl alcohol was added to the phenolic resole and then about 1% cobalt acetate was added before coating. The sample was processed as in Example 6, and the pore size distribution showed about 69% of the volume in the mesopore range and about 33% in the micropore range.

Example 12: Inventive:

About 34% melamine formaldehyde was added to the resin and the procedure of Example 11 was repeated. The pore size distribution showed about 50% of the pores in the mesopore range with a mean mesopore size of about 70 angstroms.

Examples 6–12 above show that either by adding an iron or cobalt salt or cross linking additive such as glycerine, melamine formaldehyde, or polyvinyl alcohol, the pore size distribution can be modified to obtain large pores, e.g. larger than about 50 angstroms, which otherwise do not form in phenolic resole based carbon.

Example 13: (Comparative):

A batch containing Durite liquid phenolic resin from Borden, Inc. at about 55.5%, cellulose fiber BH40 at about 22.2%, cordierite grog at about 14.7%, Methocel® at about 4.7%, sodium stearate at about 0.9%, and phosphoric acid at about 2% was mixed in a muller and then extruded into a honeycomb shape with about 400 cells/in.$^2$ and a wall thickness of about 12 mils. The sample was then dried at about 90° C. and then cured at about 125–150° C. Carbonization was carried out in nitrogen at about 900° C. for about 6 hours and activation was carried out in carbon dioxide at about 850° C. for about 4 hours. The pore size distribution of the resulting honeycomb is in the range of about 2–20 angstroms. No pores larger than 20 angstroms are present.

Example 14: (Inventive):

To the batch of Example 13, cobalt acetate at about a 1% level was added. The sample was then cured, carbonized, and activated in carbon dioxide at about 750° C. for about 4 hours. The temperature of activation was reduced because cobalt promotes gasification of carbon and at about 850° C. very high uncontrolled burnoff takes place. There is a large volume of pores in the 50–110 angstrom range proving that mesoporous carbon honeycombs can be made utilizing catalysts.

Such mesoporous bodies e.g. honeycombs are useful as catalyst supports in chemical or petrochemical reactors or for adsorption or water purification applications.

Example 15: Comparative:

About 16.59 g nickel nitrate was first dissolved into 50 ml of water and then mixed into about 1000 ml of phenolic resole resin. This high metal content resin was used for dip coating to make carbon-coated honeycombs according to a procedure similar to example 2. The metal content in the final carbon amounted to higher than 1 wt % The final porous carbon has a pore size distribution of 37% micropore, 28% mesopore, and 35% macropore. Significantly more large pores are produced as a result of high catalyst metal content.

It should be understood that while the present invention has been described in detail with respect to certain illustrative and specific embodiments thereof, it should not be considered limited to such but may be used in other ways without departing from the spirit of the invention and the scope of the appended claims.

What is claimed is:

1. An activated continuous uninterrupted carbon body having a porosity characterized in that 70% to 95% of the total porosity is in the mesopore range, and 80 to 90% of the mesopore volume is in the pore size range of about 40 to 300 angstroms, said activated carbon produced by a method comprising the steps of:
   a) forming a mixture comprising a high carbon-yielding precursor that when carbonized yields greater than about 40% carbon on a cured basis, and platinum;
   b) curing the mixture;
   c) carbonizing the carbon precursor in the mixture;
   d) activating the carbon in steam at an activation temperature of about 650° C. to 750° C.

2. An activated continuous uninterrupted carbon body having a porosity characterized in that 70% to 85% of the total porosity is in the mesopore range, and 60 to 90% of the mesopore volume is in the pore size range of about 100 to 400 angstroms, said activated carbon produced by a method comprising the steps of:
   a) forming a mixture comprising a high carbon-yielding precursor that when carbonized yield greater than about 40% carbon on a cured basis, and cobalt;
   b) curing the mixture;
   c) carbonizing the carbon precursor in the mixture;
   d) activating the carbon in steam at an activation temperature of about 650° C. to 750° C.

3. An activated continuous uninterrupted carbon body having a porosity characterized in that 80 to 95% of the total porosity is in the mesopore range, and 85 to 95% of mesopore volume is in the pore size range from 30 to 60 angstroms, said activated carbon produced by a method comprising the steps of:
   a) forming a mixture comprising a high carbon-yielding precursor that when carbonized yield greater than about 40% carbon on a cured basis, and iron provided in the +3 state;
   b) curing the mixture;
   c) carbonizing the carbon precursor in the mixture;
   d) activating the carbon in steam at an activation temperature of about 650° C. to 800° C.

* * * * *